Sept. 18, 1956     C. S. WILLIAMS     2,763,811
POWER SOURCE FOR ARC WELDING
Filed Aug. 20, 1953     2 Sheets-Sheet 1

WITNESSES:

INVENTOR
Clifton S. Williams.
BY
ATTORNEY

Sept. 18, 1956   C. S. WILLIAMS   2,763,811
POWER SOURCE FOR ARC WELDING
Filed Aug. 20, 1953   2 Sheets-Sheet 2

WITNESSES:

INVENTOR
Clifton S. Williams.
BY
ATTORNEY

United States Patent Office 2,763,811
Patented Sept. 18, 1956

2,763,811

POWER SOURCE FOR ARC WELDING

Clifton S. Williams, Pittsburgh, Pa., assignor to Westinghouse Electric Corporation, East Pittsburgh, Pa., a corporation of Pennsylvania Application August 20, 1953, Serial No. 375,460

10 Claims. (Cl. 315—205)

My invention relates to power converting apparatus and has particular relation to arc welding apparatus.

In arc welding apparatus, the potential drop across the arc produced between the welding electrode and the work, which is called the arc voltage, is usually relatively low, of the order of 20 to 40 volts. But an arc cannot be started or fired reliably between an electrode and work at this low voltage. It is for this reason that in accordance with the teachings of the prior art, the power supply for welding is capable of delivering a voltage substantially higher than the arc voltage; that is, the power supply has an open-circuit voltage substantially higher than the arc voltage and includes voltage absorbing means such as reactors or resistances for absorbing the difference between the high open-circuit voltage and the arc voltage once an arc is started. The product of the open-circuit voltage and the magnitude of the welding current in amperes is then substantially higher than the actual watt power consumed and the power factor is relatively low if the voltage absorbing means is reactance, and the losses are high if the voltage absorbing means is resistance. This low power factor is undesirable because it results in substantial losses in the conductors which supply the system. In adidtion, it is objectionable from a loading standpoint on many power supply systems and frequently precludes the use of arc welding to any considerable extent, particularly in areas in which residences are supplied from the same supply buses as is intended for use in arc welding.

It is accordingly an object of my invention to provide arc welding apparatus which shall operate at a high power factor and particularly at a substantially higher power factor than prior art apparatus.

During an arc welding operation globules and strands of melted metal tend to short-circuit the arc, reducing the power and causing the metal in the melted pool to cool. An inferior weld is thus produced and it is desirable to blow out the short circuits either just before they form or immediately after. Facilities for accomplishing this object are said to produce arc drive.

An incidental object of my invention is to provide arc welding apparatus having an effective arc drive characteristic.

In accordance with my invention, I provide arc welding apparatus including a pair of power supplies for the welding electrode and the work, one of the supplies having a high open-circuit voltage and being capable of delivering only power of low magnitude, and the other having a low open-circuit voltage and the capability of delivering power of high magnitude. The voltage and the power delivery capability of the first of these power supplies is just adequate to fire a welding arc reliably. The other of these supplies has a voltage of a magnitude at least equal to or somewhat greater than the welding arc voltage and a power delivery capability adequate to maintain the arc once it is fired, and to supply adequate heat for welding at the speeds for the material and under the conditions desired. The latter supply is also conceived to have a high ratio of short-circuit current to welding current and thus to produce effective arc drive; that is, to blow out short circuits produced by strands or globules of metal immediately after they are formed, or just as they are being formed.

The novel features that I consider characteristic of my invention are set forth generally above. The invention itself, both as to its organization and its method of operation, together with additional objects and advantages thereof, will be understood from the following description of specific embodiments when read in connection with the accompanying drawings, in which.

Figure 1:
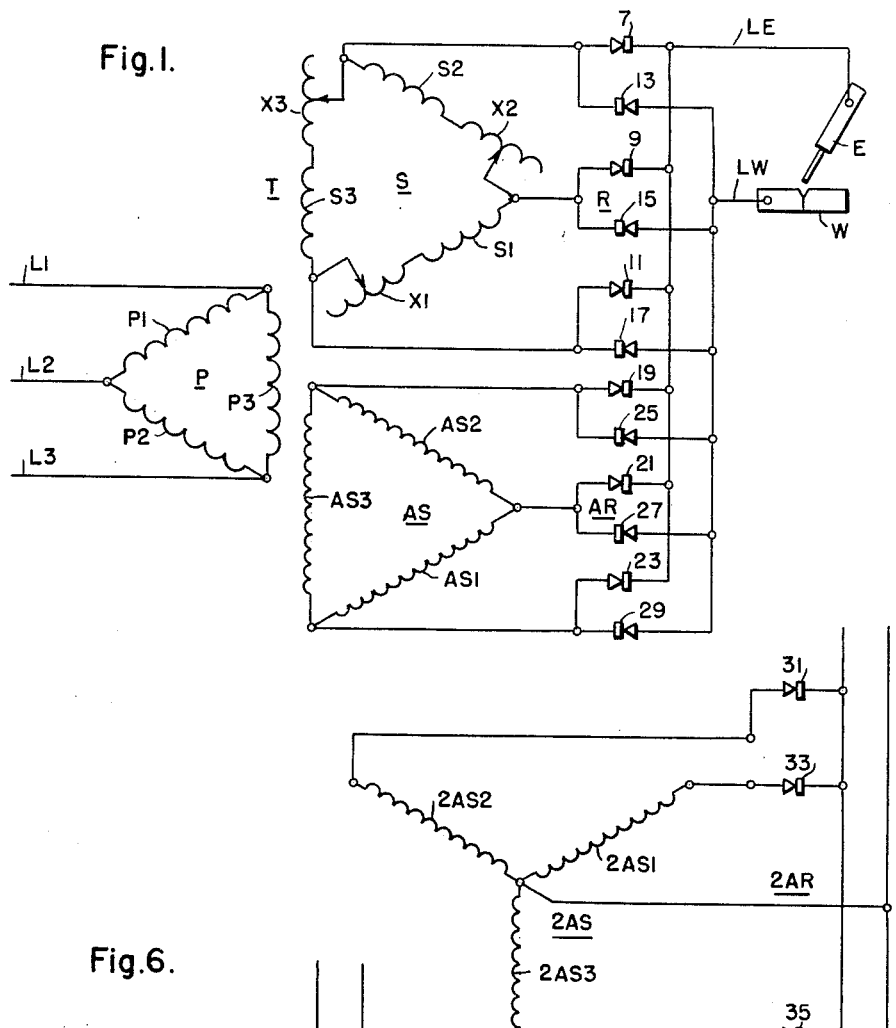
Figure 1 is a circuit diagram of a preferred embodiment of my invention.
Figure 5:
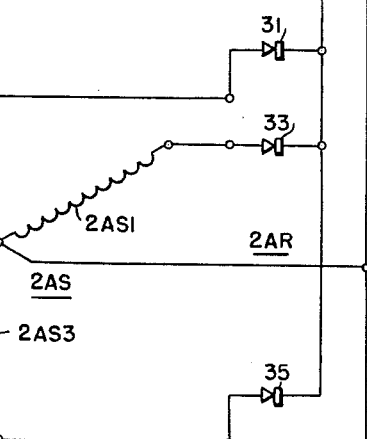
Fig. 5 is a circuit diagram of the essential part of a modification of my invention.
Figure 6:
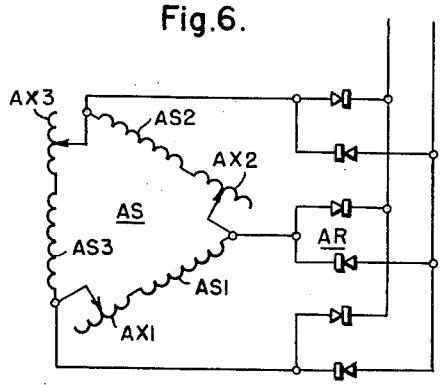
Fig. 6 is a circuit diagram of the essential part of a further modification of my invention.

My invention is disclosed in Figs. 1, 5 and 6 as applied to arc welders of the rectifier type specifically disclosed in application Serial No. 176,302, filed July 28, 1950, to Charles P. Croco, Charles H. Jennings, Ray Verne Lester and Emil F. Steinert (hereinafter called the Croco application) and an improvement of this apparatus disclosed in application Serial No. 357,321, filed May 25, 1953, to Emil F. Steinert, Harry J. Bichsel and Ray Verne Lester (hereinafter called Steinert application), both being assigned to Westinghouse Electric Corporation. My invention in its broader aspects is also applicable to welders of other types, for example, alternating current welders and such welders which embody the basic concepts of my invention are within the scope of this invention.

The apparatus shown in Fig. 1 includes a welding electrode E and work W which are supplied with current through a pair of conductors LE and LW. These conductors are in turn supplied from the buses or conductors L1, L2, L3 of a commercial polyphase supply through the secondary circuits S and AS of a transformer T and through rectifiers R and AR connected to these secondary circuits S and AS.

The primary P of the transformer T includes a plurality of windings P1, P2, P3 connected in delta to the conductors L1, L2, L3. The secondary circuit S includes secondary windings S1, S2, S3 and variable reactors X1, X2, and X3, respectively. Each of the reactors X1, X2, and X3 is connected in series with a corresponding secondary S1, S2 and S3, respectively, and these series networks are connected in a delta electrical network. The secondary windings S1, S2, S3 and the reactors X1, X2, X3, respectively may be constructed as secondary-reactor units as disclosed in the Steinert application. The secondary circuit AS includes windings AS1, AS2 and AS3, which are also connected in a delta electrical network.

The secondary circuit AS is designed to have an open-circuit voltage and a power delivery capability just adequate to fire an arc reliably between the electrode E and the work W when these components are cold. This object is accomplished by providing each of the secondaries AS1, AS2, AS3 with an adequate number of turns with respect to the number of turns of the primaries P1, P2, P3 to provide sufficient voltage for firing and also by winding these turns of the secondaries AS1, AS2, AS3 of a wire having sufficient resistance to provide the necessary internal impedance to reduce the power delivery capability to the magnitude desired. Alternatively the high internal impedance may be provided by resistance or reactance in series with the windings rather than by high impedance windings.

The secondary circuit S has an open-circuit voltage and a power delivering capability sufficient to maintain an arc once such an arc is started which supplies adequate heat for the welding between the electrode E and the work W. For this purpose, the windings S1, S2, S3 are designed with a number of turns with respect to the number of turns of the primaries P1, P2, P3 such that the voltage at the terminals of these secondaries is just higher than the arc voltage and the reactors X1, X2, X3 are designed to vary the current which is supplied for welding over the desired range. The windings S1, S2, S3 and the reactors X1, X2, X3 are also composed of wire having a sufficiently low resistance to provide the necessary low internal impedance for maintaining the arc.

The rectifier R includes a plurality of rectifier units 7, 9, 11 connected to conduct positive current from the terminals of the primary circuit S to the conductor LE and a second plurality of rectifier units 13, 15, 17 connected to conduct positive current from the conductor LW to the terminals of the primary circuit S. By positive current, I mean the flow of positive ions (or holes) as distinct from electrons. The rectifier AR includes a plurality of rectifier units 19, 21, 23 connected to conduct positive current from the terminals of the secondary circuit AS to the conductor LE and a second plurality of rectifier units 25, 27, 29 connected to connect positive current from the work W to the terminals of the positive circuit AS. The rectifier units 7 through 29 may be of the general structure and may be arranged in the same manner as the rectifier units disclosed in the Croco and Steinert applications. However, the units 19 through 29 of rectifier AR need be designed only to carry the relatively low current delivered by the secondary AS and the units 7 through 17 of rectifier R must be designed to carry the higher current delivered by the secondary S. While my invention is illustrated in Fig. 1 with the electrode conductor LE positive and the work conductor LW negative, these conductors may be at the opposite polarities, the electrode conductor LE negative and the work conductor LW positive.

Specifically, in the practice of my invention, the secondary AS is usually designed to have an open-circuit voltage of about 70 at the conductors LE and LW and to deliver current of the order of 30 amperes under short-circuit conditions of the apparatus and the other secondary S is designed to have an open-circuit voltage at the conductors LE and LW of 45 and to deliver the welding current for which and over the range of which the apparatus is rated. The latter current may vary from fifty amperes to two or three thousand amperes and the short-circuit current may be as high as four to six thousand amperes. The voltage and current of the secondary AS is selected so that it is adequate to strike the arc and does not subject the operating personnel to serious danger of electrocution. The secondary voltage and current of the secondary S is selected to provide the actual power for welding.

It will be realized that the transformer T is in effect a pair of transformers, one including the primary P and the secondary circuit S and the other the primary P and the secondary circuit AS. Apparatus including separate transformers as just described, in lieu of one transformer T with two secondary circuits, S and AS, is within the scope of my invention.

In the practice of my invention as disclosed in Fig. 1, the electrode E and work W are connected to the conductors LE and LW respectively, and the circuit breakers or other switching mechanisms for the apparatus (not shown) are closed. The apparatus is then in condition for operation. Flow of current from the high voltage circuit AS to the low voltage circuit S is prevented by the rectifiers R and AR between these circuits.

The operation is started by contacting the electrode E with the work W and then separating the electrode from the work. At this point, an arc is struck between the electrode and the work principally by the power delivered by the secondary circuit AS through the rectifier AR. Once the arc is struck the voltage between the electrode E and work W is reduced to the arc voltage and the welding proceeds with the power being delivered primarily from the secondary S. In the preferred practice of my invention, the secondary S is designed to have a high ratio between short-circuit current and arc current. Because of the high current available, the tendency of the apparatus to short circuit by reason of filler metal strands is either suppressed before the actual short circuit is produced or the short circuit is blown out immediately after it is produced.

The power factor at which this apparatus operates is relatively high because the welding current flows to a large extent under the voltage produced by the secondary circuit S which is relatively low. That is, the secondary circuit S delivers a large proportion of the current and the secondary circuit AS delivers a small proportion of the current and the sum of the product of the low open-circuit voltage of the secondary S by the high current of the secondary S plus the product of the high open-circuit voltage of the secondary AS by the low current of the secondary AS is relatively low. This advantage of my invention can be illustrated by a simple calculation.

Assume that the low open-circuit voltage of the secondary S is 45 and the open-circuit voltage of the secondary AS is 70. Also assume that the arc current has a magnitude of 145 amperes. The secondary S may be designed to deliver 120 amperes of this total of 145 and the secondary AS to deliver 25 amperes of the total. The volt-ampere product delivered by the secondary S is 45×120 or 5400 volt amperes. The volt ampere product delivered by the secondary circuit AS is 70×25 or 1750 volt amperes. The total volt amperes delivered by both windings is thus 7150 volt amperes.

Now compare this with a system including a transformer with a single secondary circuit for delivering all of the power for welding. Such a secondary circuit has an open-circuit voltage of the order of 70 volts and must deliver 145 amperes. The volt-ampere product delivered by this secondary is 70×145, or 10,150 volt amperes. Thus the volt-ampere product of apparatus of the latter type which is made in accordance with the teachings of the prior art is far higher than the volt-ampere product of apparatus in accordance with my invention.

The advantage of my invention can be viewed also from the standpoint of power factor. Assume that the potential drop across the arc in each of the systems discussed above is 30 volts. The power developed across the arc then is 30×145, or 4350 watts. The power factor of a system in accordance with my invention is then equal to 4350 divided by 7150, or .62, and the power factor of the prior art system is 4350 divided by 10,120, or .43. Thus apparatus in accordance with my system yields an improvement of almost 50% in power factor.

My invention may be further explained with reference to the graph shown in Figs. 2, 3 and 4.

Figure 2:
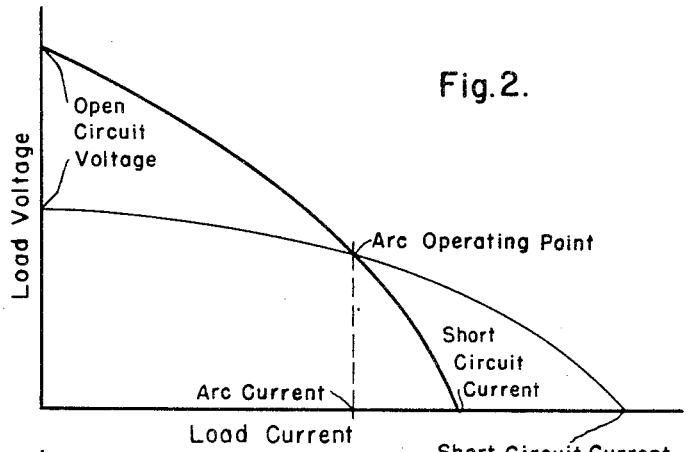
Fig. 2 is a graph illustrating the operation of prior art apparatus.

In Fig. 2, the heavy curve represents the voltage-current characteristic of prior art apparatus. The properties of this apparatus are such that the short-circuit current depends on the open-circuit voltage. In such apparatus, if the open-circuit voltage is adequate for firing the arc, the short circuit current is of moderate magnitude, and the ratio between short-circuit current and normal arc current is low. Such apparatus does not have an effective arc drive characteristic. Apparatus in which higher short-circuit current is available is represented by the light curve. In this case, the open-circuit voltage is correspondingly lower and may be so low as to be unreliable for firing the arc. It has been the practice in accordance with the teachings of the prior art in situations in which arc drive was required to privide two sources corresponding to the characteristic of the heavy curve and the light curve, respectively, of Fig. 2. It is seen that the supply represented by the light curve, during the arcing, operates at a relatively low open circuit voltage, and at the same current as the other supply, but the ratio of short-circuit current to operating current for the low voltage supply is higher than the corresponding ratio for the other supply. This combination of supplies does not provide the desirable low volt-ampere product because, to a large extent, the welding current is supplied under high open-circuit voltage, voltake becoming effective only during the arc drive intervals.

Figure 3:
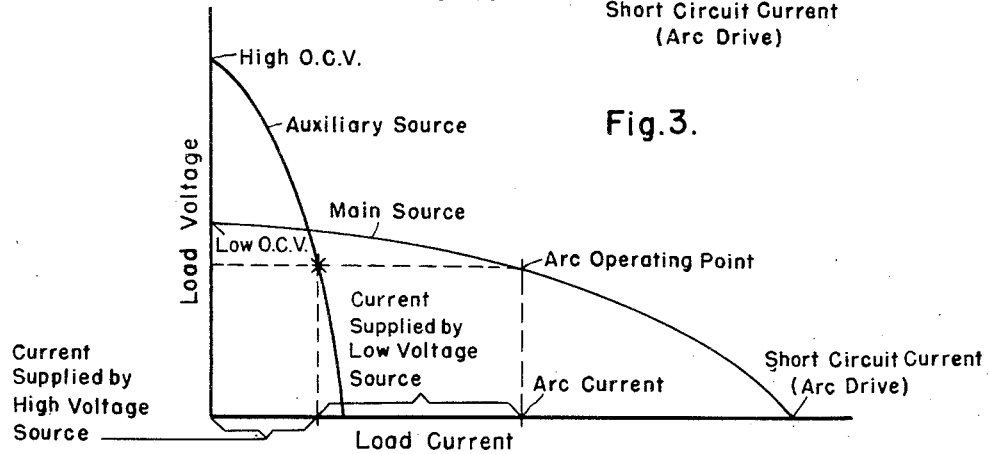
Figs. 3 and 4 are graphs illustrating the operation of my invention.

Fig. 3 shows the separate characteristics of the high-voltage low-current and low-voltage high-current supplies in accordance with my invention. It is seen that the ratio of the short-circuit current to the arc current for the low voltage supply is in such a system relatively high, and thus the desired arc drive is available.

Figure 4:
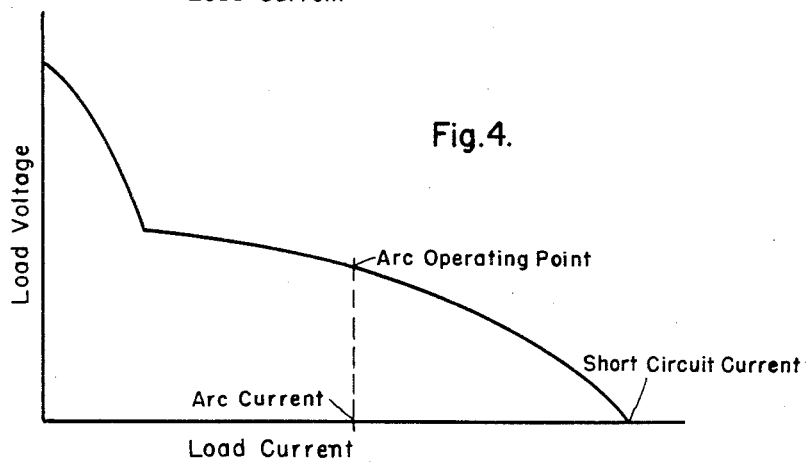

Fig. 4 presents the composite characteristic of a system in accordance with my invention.

The apparatus shown in Fig. 5 is similar to the apparatus shown in Fig. 1, except that the high-voltage low-current secondary circuit 2AS is connected in star and the rectifier 2AR associated with it is of the ordinary three-unit (31, 33, 35) type.

The apparatus shown in Fig. 6 is similar to the apparatus shown in Fig. 1 except that variable reactors AX1, AX2, AX3 are provided in series with the secondaries AS1, AS2, and AS3 of the secondary circuit AS. These reactors afford additional flexibility of control. While I have shown and described certain specific embodiments of my invention, many modifications thereof are possible. My invention, therefore, is not to be limited except insofar as is necessitated by the spirit of the prior art.

I claim as my invention:

1. Arc welding apparatus comprising a pair of conductors between which an arc for welding is to be produced, a high-voltage low-power supply, the voltage and power delivering ability of said supply being just adequate to fire an arc for welding, a low-voltage high-power supply, the voltage of said last-named supply having a magnitude at least equal to the potential across an arc and the power delivering ability being just sufficient to maintain a welding arc once it is fired and to produce adequate heat for welding, means for connecting said high-voltage supply between said conductors and means for connecting said low-voltage supply between said conductors.

2. Arc welding apparatus according to claim 1, characterized by the fact that the high-voltage supply has an open-circuit voltage of the order of 70 and is capable of delivering of the order of 30 amperes under short-circuit conditions and the low-voltage supply has an open-circuit voltage of the order of 45 and is capable of delivering the current required for welding.

3. Arc welding apparatus comprising a pair of conductors between which an arc for welding is to be produced, power-supply means for supplying said conductors and means for connecting said power supply means to said conductors, characterized by the fact that the power supply means includes a high-voltage low-power supply, the voltage and power delivering ability of said supply being just adequate to strike an arc for welding, and a low-voltage high-power supply, the voltage of said last-named supply being of a magnitude at least equal to the arc voltage of a welding arc and the power-delivering ability of said source being adequate to maintain a welding arc during a welding operation.

4. Arc welding apparatus according to claim 3, characterized by the fact that both supplies are continuously connected to the conductors during a welding operation.

5. Arc welding apparatus according to claim 4, characterized by rectifier means between said supplies for blocking the flow of current between said supplies.

6. Arc welding apparatus comprising a pair of conductors between which an arc for welding is to be produced, first transformer means including a primary adapted to be connected to a commercial power supply and a secondary circuit, the relationship between the turns of said primary and said secondary and the internal impedance of said transformer being such that when said primary is connected as aforesaid the open circuit voltage and power available at the terminals of said secondary circuit is just adequate to strike a welding arc, second transformer means including a primary adapted to be connected to a commercial power supply and a secondary circuit, the relationship between the turns of said primary and secondary circuit and the internal impedance of said second transformer means being such that when said primary of said second transformer means is connected as aforesaid the open circuit voltage at the terminals of said secondary circuit is of a magnitude at least equal to the voltage of a welding arc and the power available at said last-named terminals is adequate to maintain a welding arc, first rectifier means for connecting said secondary circuit of said first transformer means between said conductors and second rectifier means for connecting secondary circuit of said second transformer means to said conductors, said first and second rectifier means being connected in opposition to each other.

7. Arc welding apparatus according to claim 6, characterized by the fact that the secondary circuit of the second transformer means includes at least one primary winding and variable reactance means in series with said secondary winding.

8. Arc welding apparatus according to claim 6, characterized by the fact that each secondary circuit includes at least one secondary winding and variable reactance means in series with said secondary winding.

9. Arc welding apparatus according to claim 6, characterized by the fact that the first transformer means and the second transformer means have a common primary.

10. Arc welding apparatus according to claim 6, characterized by the fact that the secondary circuit of the first transformer means includes at least one winding with a first number of turns of a wire having a first resistance and the secondary circuit of said second transformer means includes at least one winding with a substantially smaller number of turns than said first number of a wire having a substantially lower resistance than said first resistance.

References Cited in the file of this patent

UNITED STATES PATENTS

| | | |
|---|---|---|
| 2,276,636 | White | Mar. 17, 1942 |
| 2,277,909 | Holslag | Mar. 31, 1942 |
| 2,460,990 | Kratz | Feb. 8, 1949 |
| 2,488,628 | Hoeppner | Nov. 22, 1949 |
| 2,509,380 | Walker | May 30, 1950 |

FOREIGN PATENTS

| | | |
|---|---|---|
| 583,708 | Great Britain | Dec. 24, 1946 |